United States Patent
Yamada

(10) Patent No.: US 12,494,703 B2
(45) Date of Patent: Dec. 9, 2025

(54) POWER SUPPLY CONTROL CIRCUIT AND POWER SUPPLY CONTROL METHOD

(71) Applicant: SINTOKOGIO, LTD., Nagoya (JP)

(72) Inventor: Tsutomu Yamada, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 232 days.

(21) Appl. No.: 18/123,605

(22) Filed: Mar. 20, 2023

(65) Prior Publication Data
US 2023/0318451 A1 Oct. 5, 2023

(30) Foreign Application Priority Data
Mar. 29, 2022 (JP) ................. 2022-053879

(51) Int. Cl.
*H02M 1/00* (2007.01)
*H02M 3/155* (2006.01)

(52) U.S. Cl.
CPC ....... *H02M 1/0025* (2021.05); *H02M 1/0009* (2021.05); *H02M 1/0038* (2021.05); *H02M 3/155* (2013.01)

(58) Field of Classification Search
CPC ............ H02M 1/0009; H02M 1/0025; H02M 1/0032; H02M 1/0038; H02M 1/0058; H02M 3/33592; H02M 3/33573; H02M 3/01; Y02B 70/10
See application file for complete search history.

(56) References Cited

U.S. PATENT DOCUMENTS 8,913,404 B2 * 12/2014 Xu .................... H02M 3/33523
363/21.13

FOREIGN PATENT DOCUMENTS

| JP | H06-013350 U | 2/1994 | |
|---|---|---|---|
| JP | 2014-027815 A | 2/2014 | |
| JP | 2016-119751 A | 6/2016 | |
| JP | 2016-208630 A | 12/2016 | |
| JP | 2017017890 A * | 1/2017 | ........ H02M 3/33546 |

* cited by examiner

*Primary Examiner* — Adolf D Berhane
*Assistant Examiner* — Jennifer C Caulk
(74) *Attorney, Agent, or Firm* — Faegre Drinker Biddle & Reath LLP

(57) ABSTRACT

A power supply control circuit includes a voltage control unit configured to operate in a voltage control mode, a current control unit configured to operate in a current control mode, a selection unit connected to output sides of the voltage control unit and the current control unit and configured to output the control value in either one of the voltage control mode and the current control mode, an auxiliary current control unit configured to operate in an auxiliary current control mode, and a compound unit connected to output sides of the selection unit and the auxiliary current control unit and configured to output, to the power unit, the control value in a control mode output by the selection unit when the power supply is turned on, and output, to the power unit, the control value in the auxiliary current control mode when the power supply is turned off.

7 Claims, 5 Drawing Sheets

POWER SUPPLY CONTROL CIRCUIT AND POWER SUPPLY CONTROL METHOD

CROSS-REFERENCE TO RELATED APPLICATION

This application is based on Japanese Patent Application No. 2022-053879 filed with Japan Patent Office on Mar. 29, 2022, the entire contents of which are hereby incorporated by reference.

TECHNICAL FIELD

The present invention relates to a power supply control circuit and a power supply control method.

BACKGROUND

With respect to a problem that a control becomes unstable due to a change of an operation amount when the control is switched from a constant current (CC) control to a constant voltage (CV) control or from the CV control to the CC control, Japanese Unexamined Patent Publication No. 2017-17890 describes ensuring stability, when the control is switched, by filtering a selected operation amount.

SUMMARY

In a device described in Japanese Unexamined Patent Publication No. 2017-17890, the control of the operation amount (control value) is made possible when both a voltage and a current are positive outputs or when both the voltage and the current are negative outputs. Therefore, if the voltage is the positive output and the current flows in a negative direction when, for example, a constant current constant voltage power supply is turned off, it may not be possible to control the current and an undershoot of the current (a phenomenon that a negative current flows) may be generated. To turn off the constant current constant voltage power supply is to stop supplying power to the constant current constant voltage power supply or to shut off the constant current constant voltage power supply.

In an aspect of an embodiment of the present invention, a power supply control circuit for outputting a control value to a power unit of a power supply includes a voltage control unit operating in a voltage control mode for outputting the control value such that a voltage measurement value of the power supply is a voltage target value, a current control unit operating in a current control mode for outputting the control value such that a current measurement value of the power supply is a current target value, a selection unit connected to output sides of the voltage control unit and the current control unit so as to output the control value in either one of the voltage control mode and the current control mode, an auxiliary current control unit operating in an auxiliary current control mode for outputting the control value in such a way as to reduce an error between a predetermined current command value and the current measurement value, and a compound unit connected to output sides of the selection unit and the auxiliary current control unit so as to output, to the power unit, the control value in a control mode output by the selection unit when the power supply is turned on, and output, to the power unit, the control value in the auxiliary current control mode when the power supply is turned off.

According to the present invention, it is possible to provide a technique capable of improving the undershoot of the current to be generated when the constant current constant voltage power supply is turned off.

DETAILED DESCRIPTION

Present Embodiment

Hereinafter, the present embodiment will be described with reference to the drawings. Note that in the following explanation, the same reference sign is given to the same or corresponding element, and the overwrapping explanation is not to be repeated. The size proportion of the drawings does not necessarily correspond with that of the explanation. The words of the "top", "bottom", "left", and "right" are based on an illustrated state and for the sake of convenience.

Figure 1:
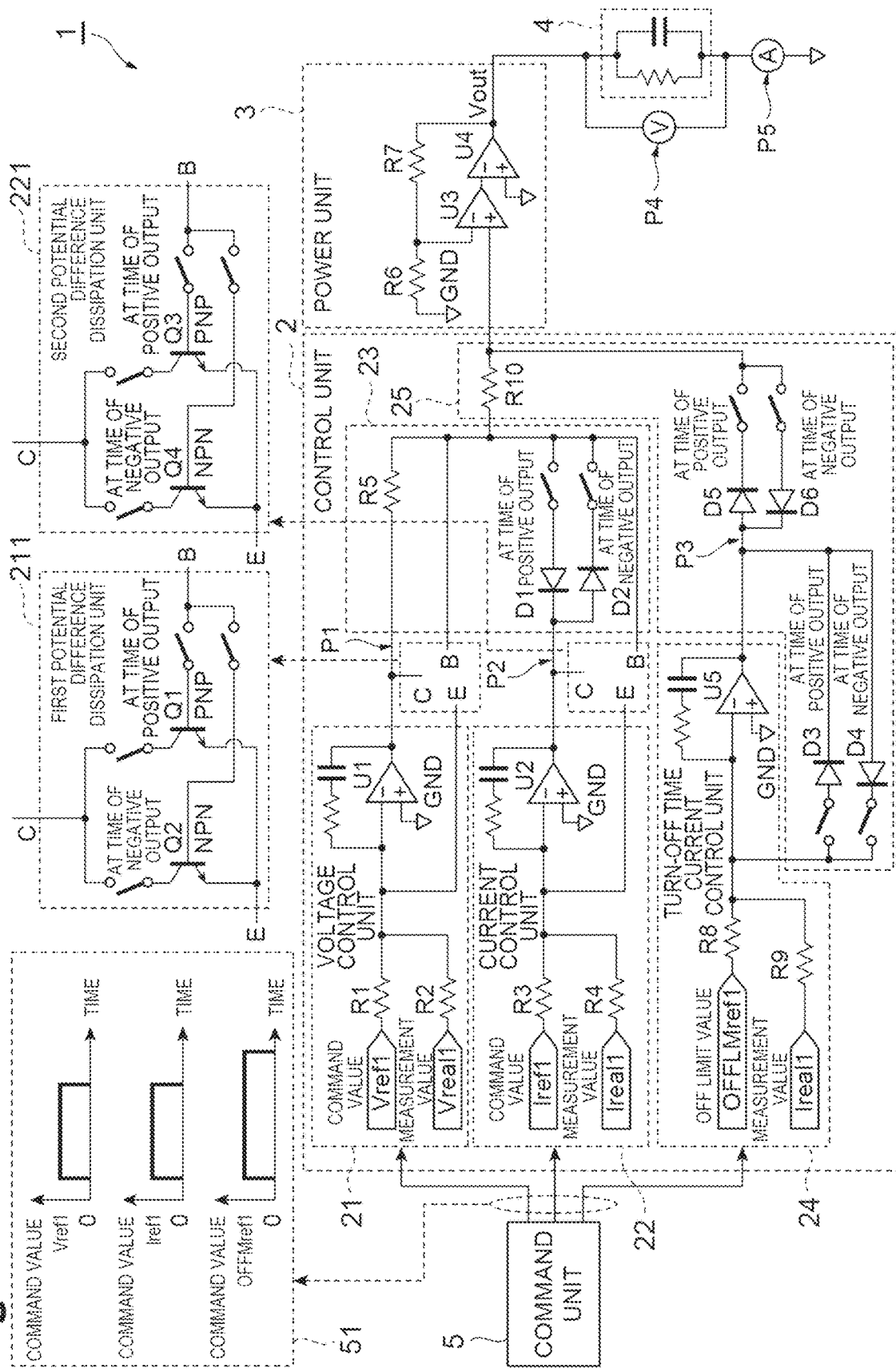
FIG. 1 is a diagram showing an example of a power supply circuit provided with a power supply control circuit according to the present embodiment.

FIG. 1 is a diagram showing an example of a power supply circuit 1 provided with a power supply control circuit according to the present embodiment. The power supply circuit 1 shown in FIG. 1 is a circuit for controlling a constant voltage constant current power supply (hereinafter, may be simply referred to as a power supply) capable of applying a constant voltage and a constant current.

The power supply circuit 1 is provided with a control unit 2 (an example of the power supply control circuit) and a power unit 3. In the example shown in FIG. 1, the power supply circuit 1 applies the constant voltage and the constant current to a load 4 as a pseudo-work.

The control unit 2 outputs a control value to the power unit 3 of the constant voltage constant current power supply. The control value is, for example, a voltage value. The power unit 3 causes the constant voltage constant current power supply to operate on the basis of the control value output from the control unit 2, and applies an output voltage Vout to the load 4.

The voltage applied to the load 4 is measured with a voltmeter. The current applied to the load 4 is measured with an ammeter. On the basis of the measured voltage and current, the control value is adjusted in the control unit 2. Thereby, the constant current and the constant voltage are applied even when a load of the load 4 changes.

The control unit 2 is provided with a voltage control unit 21, a current control unit 22, a selection unit 23, and a turn-off time current control unit 24, and a compound unit 25. The turn-off time current control unit 24 is an example of an auxiliary current control unit for assisting a current control at the time of turn-off.

The voltage control unit 21 operates in a voltage control mode for outputting the control value such that a voltage measurement value of the constant voltage constant current power supply is a voltage target value. The voltage control unit 21 outputs the control value being adjusted in such a way as to cancel an error between a voltage command value Vref1 and a voltage measurement value Vreal1.

The voltage control unit 21 includes a first input terminal for inputting the voltage command value Vref1, a first resistance R1 connected to the first input terminal, a second input terminal for inputting the voltage measurement value Vreal1, a second resistance R2 connected to the second input terminal, and a first operational amplifier U1 that is an error amplifier.

For example, a feedback control such as a PI (Proportional-Integral) control is carried out in the first operational amplifier, a capacitor connected in parallel to the first operational amplifier U1, and the first resistance R1 or the second resistance R2 connected in series to the first operational amplifier U1.

The resistance may be connected in series to the capacitor being connected in parallel to the first operational amplifier U1 as shown in FIG. 1. For example, the feedback control is a control for comparing, with a target value, an output value to be output based on an input value and reflecting the output value to the input value. The target value is, for example, 0 at the time of the turn-off of the present embodiment. The resistance connected in series to the capacitor being connected in parallel to the first operational amplifier U1 is connected in order to adjust a time required for the turn-on, the turn-off, and the like of the constant current constant voltage power supply. To turn on the constant current constant voltage power supply is to start supplying power to the constant current constant voltage power supply, or to turn on power of the constant current constant voltage power supply.

The voltage command value Vref1 is a target voltage value of the constant voltage constant current power supply. The voltage command value Vref1 is set to a given value within a performance range of the constant voltage constant current power supply. The voltage measurement value Vreal1 is a voltage value measured by a voltmeter connected to the load 4. An output side of each of the first resistance R1 and the second resistance R2 is connected to a noninverting input terminal (−) of the first operational amplifier U1.

Since the first input terminal and the second input terminal are connected to the noninverting input terminal (−) of the first operational amplifier U1 respectively through the first resistance R1 and the second resistance R2, a deviation between the voltage command value Vref1 and the voltage measurement value Vreal1 is input to the noninverting input terminal (−) of the first operational amplifier U1. An inverting input terminal (+) of the first operational amplifier U1 is grounded.

Since the deviation between the voltage command value Vref1 and the voltage measurement value Vreal1 is input to the noninverting input terminal (−) of the first operational amplifier U1, the deviation between the voltage command value Vref1 and the voltage measurement value Vreal1 is amplified, and the control value being reverse characteristics of the deviation is output. A resistance and a capacitor are connected to the first operational amplifier U1 for phase compensation.

The current control unit 22 operates in a current control mode for outputting the control value such that a current measurement value of the constant voltage constant current power supply is a current target value. The current control unit 22 outputs the control value being adjusted in such a way as to cancel an error between a current command value Iref1 and a current measurement value Ireal1.

The current control unit 22 includes a third input terminal for inputting the current command value Iref1, a third resistance R3 connected to the third input terminal, a fourth input terminal for inputting the current measurement value Ireal1, a fourth resistance R4 connected to the fourth input terminal, and a second operational amplifier U2 that is an error amplifier.

For example, the feedback control such as the PI control is carried out in the second operational amplifier U2, a capacitor connected in parallel to the second operational amplifier U2, and the third resistance R3 or the fourth resistance R4 connected in series to the second operational amplifier U2.

The resistance may be connected in series to the capacitor being connected in parallel to the second operational amplifier U2 as shown in FIG. 1. The resistance to be connected in series to the capacitor being connected in parallel to the second operational amplifier U2 is connected in order to adjust the time required for the turn-on, the turn-off, and the like of the constant current constant voltage power supply.

The current command value Iref1 is a target current value of the constant voltage constant current power supply. The current command value Iref1 is set to a given value within the performance range of the constant voltage constant current power supply. The current measurement value Ireal1 is a current value measured by an ammeter connected to the load 4.

An output side of each of the third resistance R3 and the fourth resistance R4 is connected to a noninverting input terminal (−) of the second operational amplifier U2. Since the third input terminal and the fourth input terminal are connected to the noninverting input terminal (−) of the second operational amplifier U2 respectively through the third resistance R3 and the fourth resistance R4, a deviation between the current command value Iref1 and the current measurement value Ireal1 is input to the noninverting input terminal (−) of the second operational amplifier U2. An inverting input terminal (+) of the second operational amplifier U2 is grounded.

Since the deviation between the current command value Iref1 and the current measurement value Ireal1 is input to the noninverting input terminal (−) of the second operational amplifier U2, the deviation between the current command value Iref1 and the current measurement value Ireal1 is amplified, and the control value being reverse characteristics of the deviation is output. A resistance and a capacitor are connected to the second operational amplifier U2 for phase compensation.

The selection unit 23 is connected to output sides of the voltage control unit 21 and the current control unit 22, and outputs the control value in either one of the voltage control mode and the current control mode. The selection unit 23 connects in parallel the voltage control unit 21 and the current control unit 22.

The selection unit 23 includes a fifth resistance R5, a first diode D1, and a second diode D2. For example, the selection unit 23 outputs the control value in an either one of the modes of the voltage control mode and the current control mode such that an absolute value of the control value is made smaller. For example, the control value is calculated after being converted into a voltage.

An input terminal of the fifth resistance R5 is connected to an output side of the first operational amplifier U1 of the voltage control unit 21. The first diode D1 and the second diode D2 are connected in parallel to an output side of the second operational amplifier U2 of the current control unit 22.

As the first diode D1 is connected in an opposite direction to an output of the second operational amplifier U2, a cathode of the first diode D1 is connected to the output side of the second operational amplifier U2 in such a way as to face the output of the second operational amplifier U2.

As the second diode D2 is connected in a positive direction to the output of the second operational amplifier U2, a cathode of the second diode D2 is connected to the output side of the second operational amplifier U2 in such a way as to face in the same direction as the output of the second operational amplifier U2.

Either one of the first diode D1 and the second diode D2 is connected to the output side of the second operational amplifier U2 by a switch. The first diode D1 is connected to the output side of the second operational amplifier U2 when the output of the second operational amplifier U2 is a positive output, and the second diode D2 is connected to the output side of the second operational amplifier U2 when the output of the second operational amplifier U2 is a negative output. The first diode D1 and the second diode D2 are connected to the output side of the current control unit 22 in a direction opposite to an output.

In the selection unit 23, the fifth resistance R5 is connected to the output side of the voltage control unit 21 and either one of the first diode D1 and the second diode D2 is connected to the output side of the current control unit 22.

The selection unit 23 includes an output terminal connected to an output side of the fifth resistance R5 and an output side of the first diode D1 and the second diode D2, thereby constructing a so-called diode OR connection for connecting in parallel the voltage control unit 21 and the current control unit 22 and causing either one of the voltage control unit 21 and the current control unit 22 to operate.

In the case of the diode OR connection, when the control value is output in the voltage control mode by the voltage control unit 21, the output of the second operational amplifier U2 of the current control unit 22 is saturated at a voltage of a circuit power supply (not shown).

The circuit power supply refers to a current source or a voltage source for providing a voltage or a current to the power supply circuit 1. When the control value is output in the current control mode by the current control unit 22, the output of the first operational amplifier U1 of the voltage control unit 21 is saturated at the voltage of the circuit power supply. When the selection unit 23 is provided, the power supply control circuit operates while switching between the voltage control mode and the current control mode by way of a circuit including a diode therein.

An output terminal of the selection unit 23 is connected to the power unit 3 through a tenth resistance R10. As will be described below, when the constant voltage constant current power supply is turned on, the power unit 3 is driven according to the control value output from the output terminal of the selection unit 23, and applies the voltage and the current to the load 4 in accordance with the control value.

The power unit 3 includes, as am example, a sixth resistance R6, a seventh resistance R7, a third operational amplifier U3, and a fourth operational amplifier U4. An output side of the selection unit 23 is connected to an inverting input terminal (+) of the third operational amplifier U3.

A voltage being set by the sixth resistance R6 and the seventh resistance R7 is input to the noninverting input terminal (−) of the third operational amplifier U3. An output side of the third operational amplifier U3 is connected to a noninverting input terminal (−) of the fourth operational amplifier U4. The inverting input terminal (+) of the fourth operational amplifier U4 is grounded.

The power unit 3 generates a driving pulse in a PWM mode or the like for modulating a pulse width in accordance with the control value being output from the selection unit 23, so as to transmit the driving pulse to an unillustrated driver. As the power unit 3 transmits the driving pulse to the driver, the voltage and the current in accordance with the control value are applied to the load 4.

The control unit 2 may be provided with a dissipation unit to make such improvement as to cancel an overshoot of the voltage when the constant voltage constant current power supply is turned on. The dissipation unit has a function to reduce a potential difference between the voltage control mode and the current control mode.

Specifically, for example, the dissipation unit cancels a difference between the control value of the voltage control unit 21 and the control value of the current control unit 22. More specifically, for example, the dissipation unit consists of one set (for example, a potential difference dissipation unit 211 and a second potential difference dissipation unit to be described later), with each dissipation unit being provided with a transistor for operating at the time of the positive output (for example, a first transistor Q1, a third transistor Q3, or the like to be described later) and a transistor for operating at the time of the negative output (for example, a second transistor Q2, a fourth transistor Q4, or the like to be described later), so as to cancel the difference between the control value of the voltage control unit 21 and the control value of the current control unit 22.

Since the dissipation unit reduces the potential difference between the voltage control mode and the current control mode, the power supply control circuit can reduce a fluctuation of the control value when the power supply is turned on, for example. Thereby, for example, the power supply control circuit can improve the overshoot of the voltage to be generated when the power supply is turned on.

In the example shown in FIG. 1, the control unit 2 includes the first potential difference dissipation unit 211 and the second potential difference dissipation unit 221 as the dissipation unit. The first potential difference dissipation unit 211 and the second potential difference dissipation unit 221 are respectively provided at the output sides of the voltage control unit 21 and the current control unit 22 so as to cancel the difference between the control value of the voltage control unit 21 and the control value of the current control unit 22.

The first potential difference dissipation unit 211 is provided at the output side of the voltage control unit 21. As a specific example, the first potential difference dissipation unit 211 includes the first transistor Q1 and the second transistor Q2.

The first transistor Q1 is a PNP transistor. A base of the first transistor Q1 is connected between the fifth resistance R5 and the tenth resistance R10. A collector of the first transistor Q1 is connected between the first operational amplifier U1 and the fifth resistance R5.

An emitter of the first transistor Q1 is connected between the first resistance R1 and the second resistance R2, and the first operational amplifier U1. The second transistor Q2 is an NPN transistor. Connection destinations of a base, a collector, and an emitter of the second transistor Q2 are the same as those of the first transistor Q1.

The first transistor Q1 and the second transistor Q2 are connected in parallel, and either one is connected by a switch. The first transistor Q1 is connected when the output of the first operational amplifier U1 is the positive output, and the second transistor Q2 is connected when the output of the first operational amplifier U1 is the negative output. The second potential difference dissipation unit 221 is provided at the output side of the current control unit 22. The configuration of the second potential difference dissipation unit 221 is the same as that of the first potential difference dissipation unit 211.

When there is a potential difference (a deviation) between the voltage (the control value) at the output side of the voltage control unit 21 and the voltage (the control value) at the output side of the current control unit 22, the current flows between the base and the emitter of the first potential difference dissipation unit 211. Thereby, the current flows between the collector and the emitter, and an input to the noninverting input terminal (−) of the first operational amplifier U1 increases.

As the input to the noninverting input terminal (−) of the first operational amplifier U1 increases, the control value of the first operational amplifier U1 is adjusted such that the deviation between the voltage control unit 21 and the current control unit 22 is made smaller. The same applies to the second potential difference dissipation unit 221, and when there is a potential difference between the voltage at the output side of the voltage control unit 21 and the voltage at the output side of the current control unit 22, the control value of the second operational amplifier U2 is adjusted.

The turn-off time current control unit 24 of the control unit 2 improves an undershoot of the current when the constant voltage constant current power supply is turned off. The turn-off time current control unit 24 operates in an auxiliary current control mode for outputting the control value in such a way as to reduce an error between a predetermined current command value and the current measurement value.

The turn-off time current control unit 24 outputs the control value being adjusted in such a way as to cancel an error between a predetermined OFF limit value OFFMref1 and the current measurement value Ireal1. The turn-off time current control unit 24 includes a fifth input terminal for inputting the OFF limit value OFFMref1, an eighth resistance R8 connected to an input terminal of the fifth input terminal, a six input terminal for inputting the current measurement value Ireal1, a ninth resistance R9 connected to an input terminal of the sixth input terminal, and a fifth operational amplifier U5 that is an error amplifier.

For example, the feedback control such as the PI (Proportional-Integral) control is carried out in the fifth operational amplifier U5, a capacitor connected in parallel to the fifth operational amplifier U5, and the fifth resistance R5 or the sixth resistance R6 connected in series to the fifth operational amplifier U5.

The resistance may be connected in series to the capacitor being connected in parallel to the fifth operational amplifier U5 as shown in FIG. 1. The resistance connected in series to the capacitor being connected in parallel to the fifth operational amplifier U5 is connected in order to adjust the time required for the turn-on, the turn-off, and the like of the constant current constant voltage power supply.

The OFF limit value OFFMref1 is a target current value of the constant voltage constant current power supply at the time of the turn-off. The OFF limit value OFFMref1 is set to a given value within the performance range of the constant voltage constant current power supply. The current measurement value Ireal1 is a current value measured by the ammeter connected to the load 4.

As each of output sides of the eighth resistance R8 and the ninth resistance R9 is connected to a noninverting input terminal (−) of the fifth operational amplifier U5, a deviation between the OFF limit value OFFMref1 and the current measurement value Ireal1 is input to the noninverting input terminal (−) of the fifth operational amplifier U5. An inverting input terminal (+) of the fifth operational amplifier U5 is grounded.

Since the deviation between the OFF limit value OFFMref1 and the current measurement value Ireal1 is input to the noninverting input terminal (−) of the fifth operational amplifier U5, the deviation between the OFF limit value OFFMref1 and the current measurement value Ireal1 is amplified, and the control value being reverse characteristics of the deviation is output. Note that a resistance and a capacitor are connected to the fifth operational amplifier U5 for phase compensation.

The compound unit 25 is connected to the output sides of the selection unit 23 and the turn-off time current control unit 24. The compound unit 25 outputs the control value to the power unit 3 in a control mode output by the selection unit 23 when the constant voltage constant current power supply is turned on.

The compound unit 25 outputs the control value to the power unit 3 in the auxiliary current control mode when the constant voltage constant current power supply is turned off. The compound unit 25 operates in the auxiliary current control mode only at the time of the turn-off.

The compound unit 25 connects in parallel the voltage control unit 21 and the current control unit 22, and the turn-off time current control unit 24. The compound unit 25 includes a tenth resistance R10, a third diode D3, a fourth diode D4, a fifth diode D5, and a sixth diode D6.

An input terminal of the tenth resistance R10 is connected to the output side of the fifth resistance R5 (the output side of the selection unit 23). The fifth diode D5 and the sixth diode D6 are connected in parallel to an output side of the fifth operational amplifier U5 of the turn-off time current control unit 24. The fifth diode D5 is connected in the positive direction of (the same direction as) an output of the fifth operational amplifier U5.

A cathode of the fifth diode D5 is connected to the output side of the fifth operational amplifier U5 in such a way as to face in the same direction as the output of the fifth operational amplifier U5. The sixth diode D6 is connected in an opposite direction to the output of the fifth operational amplifier U5. In other words, a cathode of the sixth diode D6 is connected to the output side of the fifth operational amplifier U5 in such a way as to face in the opposite direction to the output of the fifth operational amplifier U5.

Either one of the fifth diode D5 and the sixth diode D6 is connected to the output side of the fifth operational amplifier U5 by a switch. The fifth diode D5 is connected to the output side of the fifth operational amplifier U5 when the output of the fifth operational amplifier U5 is the positive output, and the sixth diode D6 is connected to the output side of the fifth operational amplifier U5 when the output of the fifth operational amplifier U5 is the negative output. The fifth diode D5 and the sixth diode D6 are connected to the output side of the current control unit 22 in the same direction as the output.

The third diode D3 and the fourth diode D4 are connected in parallel to the fifth operational amplifier U5 of the turn-off time current control unit 24. The third diode D3 is connected in the positive direction to the output of the fifth operational amplifier U5.

A cathode of the third diode D3 is connected in such a way as to face in the same direction as the output of the fifth operational amplifier U5. The fourth diode D4 is connected in the opposite direction to the output of the fifth operational amplifier U5. A cathode of the fourth diode D4 is connected in such a way as to face in the opposite direction to the output of the fifth operational amplifier U5.

Either one of the third diode D3 and the fourth diode D4 is connected to the output side of the fifth operational amplifier U5 by a switch. The third diode D3 is connected to the output side of the fifth operational amplifier U5 when the output of the fifth operational amplifier U5 is the positive output, and the fourth diode D4 is connected to the output side of the fifth operational amplifier U5 when the output of the fifth operational amplifier U5 is the negative output.

The third diode D3 and the fourth diode D4 are connected to the output side of the current control unit 22 in the same direction as the output. Note that the compound unit 25 does not need to include the third diode D3 and the fourth diode D4.

In the compound unit 25, the tenth resistance R10 is connected to an output side of the fifth resistance R5 and either one of the fifth diode D5 and the six diode D6 is connected to the output side of the turn-off time current control unit 24.

The compound unit 25 includes an output terminal connected to an output side of the tenth resistance R10 and the output sides of the fifth diode D5 and the sixth diode D6. In other words, the compound unit 25 connects in series the voltage control unit 21 and the current control unit 22, and the turn-off time current control unit 24, and causes either one of the voltage control unit 21 (or the current control unit 22) and the turn-off time current control unit 24 to operate.

According to the compound unit 25 as described above, when the power supply is turned on, the power unit 3 is controlled by either one of a voltage of an output terminal of the current control unit 22 and a voltage of an output terminal of the voltage control unit 21, and an output (control value) of an output terminal of the auxiliary current control unit is approximately zero.

When the power supply is turned off, the respective voltages at the output terminals of the voltage control unit and the current control unit are approximately zero, and the operation is carried out in the auxiliary current control mode for controlling the power unit by the voltage at the output terminal of the auxiliary current control unit. When the compound unit 25 is provided, the power supply control circuit operates in the auxiliary current control mode by way of a circuit including a diode when the power supply is turned off.

Figure 2A:
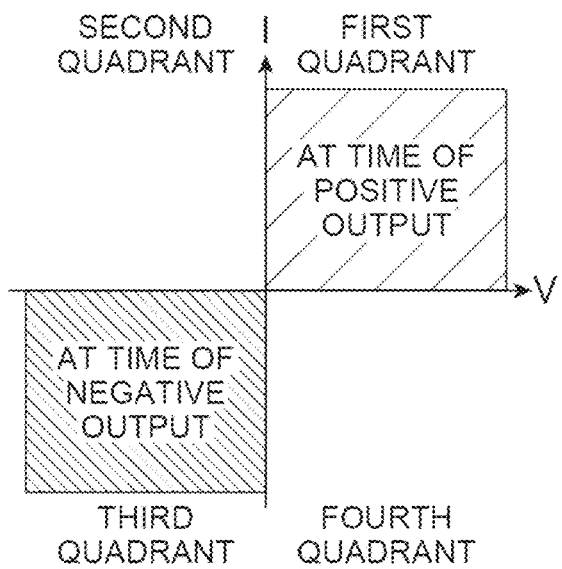
FIG. 2A is a diagram showing controllable ranges of a voltage-current control.
Figure 2B:
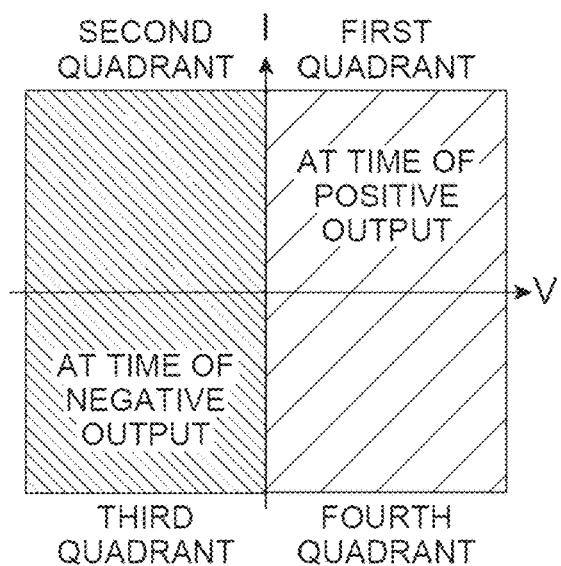
FIG. 2B is a diagram showing controllable ranges of a voltage-current control.
Figure 2C:
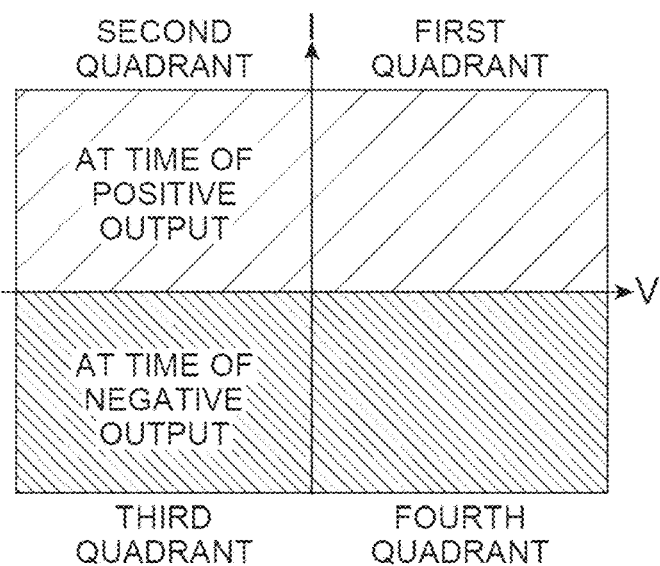
FIG. 2C is a diagram showing controllable ranges of a voltage-current control.

FIG. 2A to 2C are diagrams each showing controllable ranges of a voltage-current control. As shown in FIG. 2A, in the voltage control mode and the current control mode, when both the voltage and the current are the positive outputs or when both the voltage and the current are the negative outputs, the control of the control value is made possible.

For example, if the voltage is the positive output and the current flows in a negative direction when the constant current constant voltage power supply is turned off, it may not be possible to control the current and the undershoot of the current may be generated.

Since the turn-off time control unit 24 outputs the control value being adjusted in such a manner as to cancel the error between the predetermined OFF limit value OFFMref1 and the current measurement value Ireal1 at the time of the turn-off, it is possible to control the range being unable to be controlled in the voltage control mode and in the current control mode.

For example, as shown in FIG. 2B, a second quadrant and a fourth quadrant are also ranges being able to be controlled. Therefore, even when the voltage is the positive output and the current flows in the negative direction, it is possible to improve the undershoot of the current as the current can be controlled in such a way as to be flown in the positive direction.

In the control unit 2, while the constant voltage constant current power supply is being turned on, the control value is output by the selection unit 23 in either one of the control modes of the voltage control mode and the current control mode. For example, the voltage control mode is a constant voltage control mode for outputting the control value such that the voltage measurement value is the voltage target value.

For example, the current control mode is a constant current control mode for outputting the control value such that the current measurement value is the current target value. Each control mode realizes a constant voltage function that is a function to maintain the voltage to be constant or a constant current function that is a function to maintain the current to be constant. When the constant voltage constant current power supply is turned off, the control value is output in the auxiliary current control mode.

Even if a negative current flows when the voltage is the positive output, for example, the control unit 2 can control the current to be the current command value. Thus, the control unit 2 can improve the undershoot of the current to be generated when the constant current constant voltage power supply is turned off.

The control unit 2 according to the present embodiment described above shows an example of the control unit according to the present invention. The control unit 2 according to the present invention is not limited to the control unit 2 according to the present embodiment, and may be the one being obtained by changing the control unit 2 according to the present embodiment or by applying the control unit 2 to another item to the extent that does not change the subject matter described in each claim.

Figure 3:
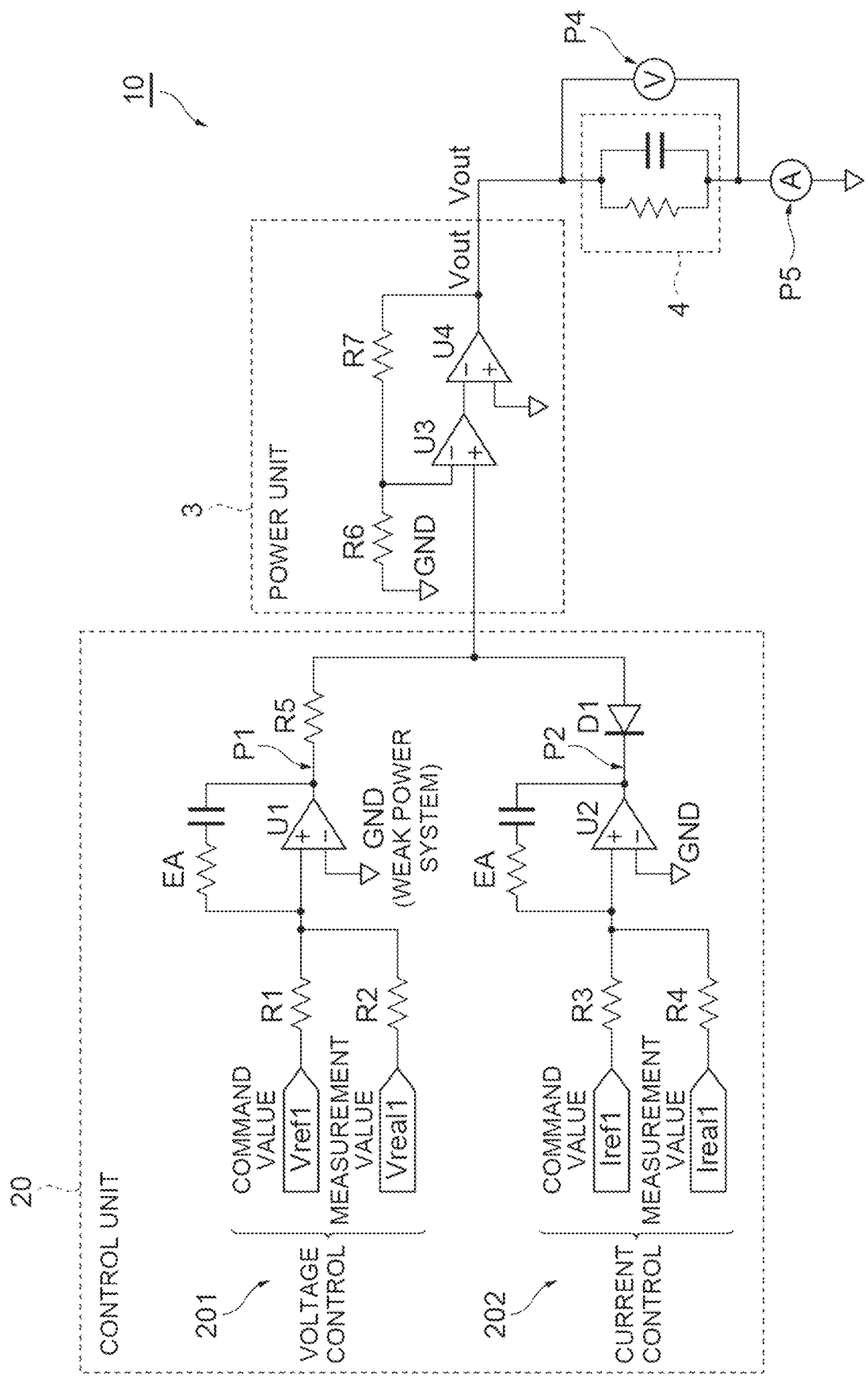
FIG. 3 is a diagram showing an example of a power supply circuit provided with a power supply control circuit according to a comparative example.

By using FIG. 3, a description will be given of the details of the overshoot of the voltage and the undershoot of the current when the power supply circuit 1 according to the present embodiment is used. FIG. 3 is a diagram showing an example of a power circuit provided with a power supply control circuit according to a comparative example.

A power supply circuit 10 shown in FIG. 3 is different from the power supply circuit 1 in that the power supply circuit 10 is not provided with the first potential difference dissipation unit 211, the second potential difference dissipation unit 221, the turn-off time current control unit 24, and the compound unit 25, and the other points are the same.

Figure 4A:
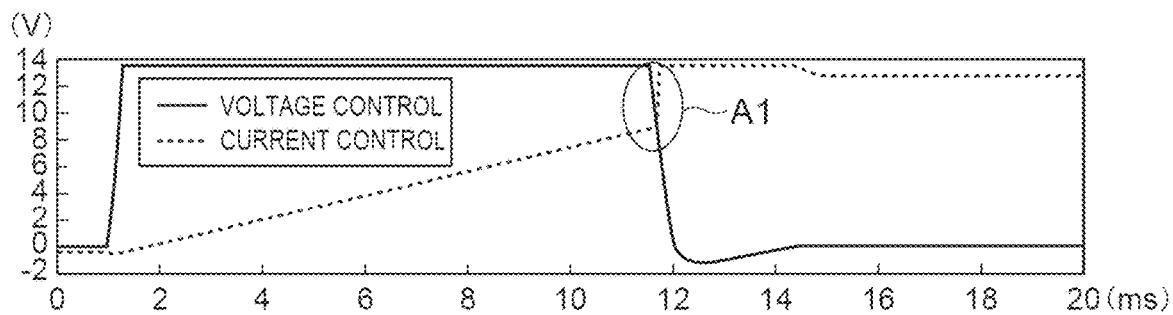
FIG. 4A shows measurement result of the voltage-current control in the comparative example and the embodiment.

FIG. 4A to 4D show measurement results of the voltage-current control in the comparative example and the present embodiment. FIG. 4A shows the control values of the voltage control and the current control according to the comparative example, and the results measured at a first position P1 and a second position P2 of FIG. 3.

As shown in FIG. 4A, the control value of the voltage control mode is saturated at around 14 V in 1 ms from a start, and the current control mode has a predominant control. Then, at the timing of 12 ms, the control value of the current control mode exceeds the control value of the voltage control mode (a first range A1).

The control value of the current control mode rapidly drops and the control value of the current control mode is saturated in a vicinity of 14 V, which makes it possible to confirm that a difference is generated in the control values when the voltage control and the current control are switched.

Figure 4B:
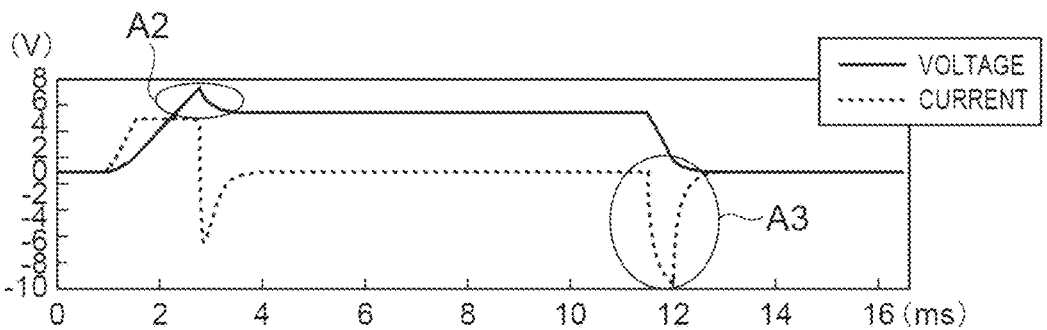
FIG. 4B shows measurement result of the voltage-current control in the comparative example and the embodiment.

FIG. 4B shows measurement values of the voltage and the current being applied to the load 4 when the voltage-current control of the comparative example is executed. The measurement spots are a fourth position P4 and a fifth position P5 of FIG. 3. As shown in FIG. 4B, it is possible to confirm that the voltage overshoots at the time of the turn-on (a second range A2) and the current undershoots at the time of the turn-off (a third range A3).

Figure 4C:
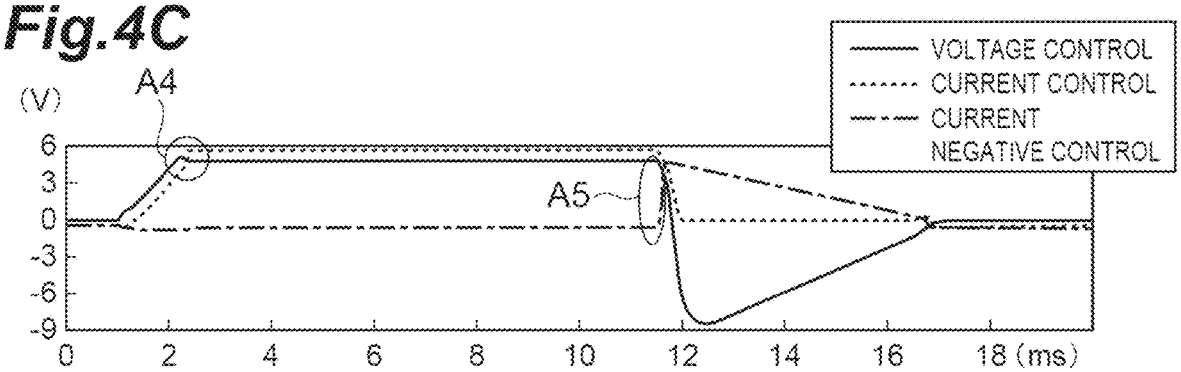
FIG. 4C shows measurement result of the voltage-current control in the comparative example and the embodiment.

FIG. 4C shows the control values of the voltage control, the current control, and a current negative control according to the embodiment, and the results measured at the first position P1, the second position P2, and a third position P3 of FIG. 1. The current negative control is the auxiliary current control mode described above.

As shown in FIG. 4C, the difference is prevented from being generated in the control values when the voltage control and the current control are switched by the first potential difference dissipation unit 211 and the second potential difference dissipation unit 221 (a fourth range A4). Furthermore, it is possible to confirm that the turn-off time current control unit 24 allows the current value to be controlled at the time of the turn-off (a fifth range A5).

Figure 4D:
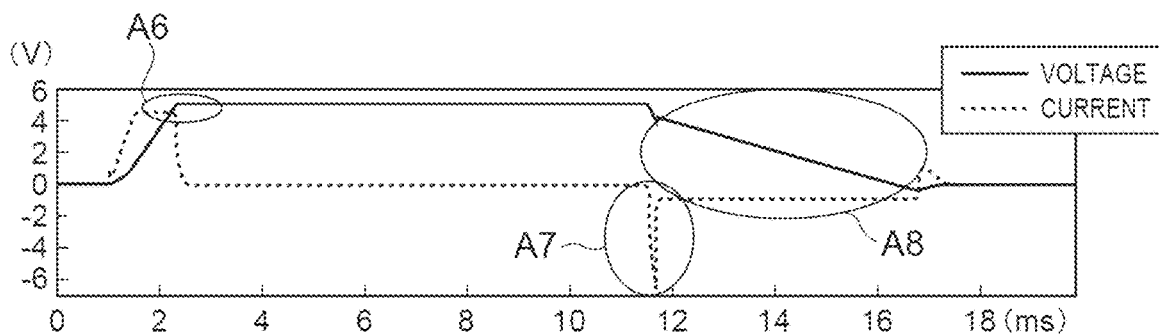
FIG. 4D shows measurement result of the voltage-current control in the comparative example and the embodiment.

FIG. 4D shows measurement values of the voltage and the current being applied to the load 4 when the voltage-current control of the embodiment is executed. The measurement spots are a fourth position P4 and a fifth position P5 of FIG. 1. As shown in FIG. 4D, it is possible to confirm that the overshoot of the voltage is improved at the time of the turn-on (a sixth range A6), and the undershoot of the current is improved though it is not possible to completely eliminate the undershoot at the time of the turn-off (a third range A3, and a seventh range A7). Furthermore, it is possible to confirm that the control is made possible even if the negative current flows when the voltage is the positive output (an eighth range A8).

The present invention is not limited to the embodiment described above. For example, the auxiliary current control unit may be a circuit and the like for assisting the current control at the time of the turn-off. For example, the auxiliary current control unit may be a voltage control circuit for assisting the current control at the time of the turn-off by controlling the voltage. When the auxiliary current control unit is the voltage control circuit, the auxiliary current control unit is a circuit in which the voltage control unit 21 and the current control unit 22 are switched, for example.

As shown in FIG. 2C, when the auxiliary current control unit is the voltage control circuit, the second quadrant and the fourth quadrant are also controllable ranges. Therefore, even if the voltage is the negative output and the current flows in the positive direction, the undershoot of the voltage can be improved.

For example, the auxiliary current control unit may be the current control circuit and the voltage control circuit for assisting the current control at the time of the turn-off by controlling both the voltage and the current. For example, the feedback control by the error amplifier is not limited to the PI control and may be a PID (Proportional-Integral-Differential) control or the like.

The power supply circuit 1 may be provided with a command unit 5 for providing the control unit 2 with a command 51 such as the voltage command value Vref1, the current command value Iref1, or the OFF limit value OFFMref1. For example, the command unit 5 is configured with a circuit such as one or a plurality of FPGA (Field-Programmable Gate Array).

For example, the command unit 5 outputs the OFF limit value OFFMref1 later than the end of the current command value Iref1 or the voltage command value Vref1. Note that, for example, the command unit 5 executes processing by such processing procedures as command processing as shown in FIG. 5.

Figure 5:
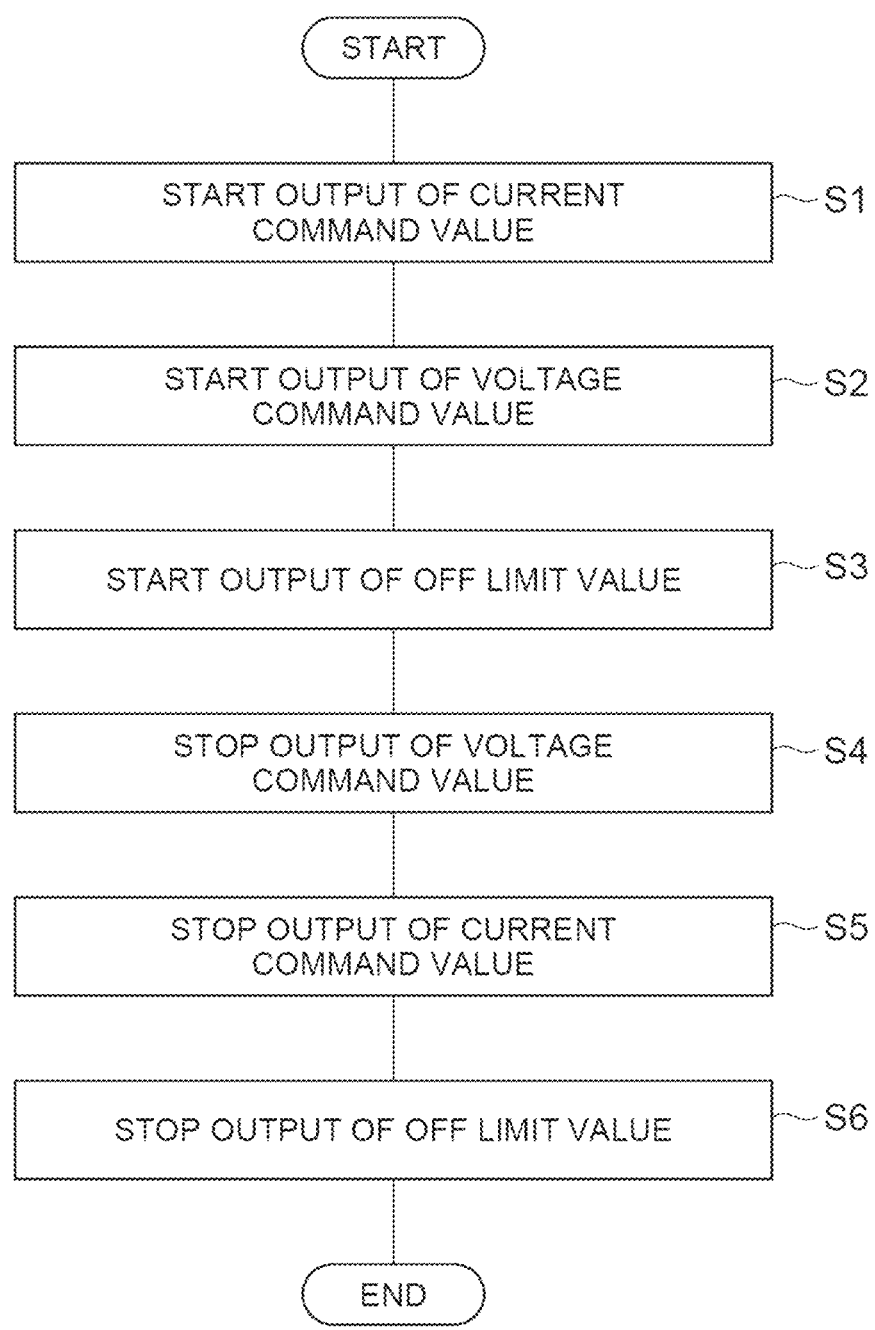
FIG. 5 is a flow chart showing processing procedures related to command processing.

FIG. 5 is a flow chart showing the processing procedures related to the command processing that is a power supply control method. For example, at first, the command unit 5 starts an output of the current command value Iref1 (step S1), starts an output of the voltage command value Vref1 (step S2), and starts an output of the OFF limit value OFFMref1 (step S3).

Then, the command unit 5 stops the output of the voltage command value Vref1 (step S4), stops the output of the current command value Iref1 (step S5), and stops the output of the OFF limit value OFFMref1 (step S6).

Note that, for example, the order of the step S1, the step S2, and the step S3 may be changed, respectively. Further, the order of the step S4 and the step S5 may also be changed.

What is claimed is:

1. A power supply control circuit configured to output a control value to a power unit of a power supply, the power supply control circuit comprising:
    a voltage control unit configured to operate in a voltage control mode for outputting the control value such that a voltage measurement value of the power supply is a voltage target value;
    a current control unit configured to operate in a current control mode for outputting the control value such that a current measurement value of the power supply is a current target value;
    a selection unit connected to output sides of the voltage control unit and the current control unit and configured to output the control value in either one of the voltage control mode and the current control mode;
    an auxiliary current control unit configured to operate in an auxiliary current control mode for outputting the control value in such a way as to reduce an error between a predetermined current command value and the current measurement value; and
    a compound unit connected to output sides of the selection unit and the auxiliary current control unit and configured to output, to the power unit, the control value in a control mode output by the selection unit when the power supply is turned on, and output, to the power unit, the control value in the auxiliary current control mode when the power supply is turned off.

2. The power supply control circuit according to claim 1, wherein the selection unit includes:
    a resistance connected to the output side of the voltage control unit;
    a diode connected to the output side of the current control unit in an opposite direction to an output; and
    an output terminal connected to an output side of the resistance and an output side of the diode.

3. The power supply control circuit according to claim 1, wherein the compound unit includes:
   a resistance connected to the output side of the selection unit;
   a diode connected to the output side of the auxiliary current control unit in a same direction as an output; and
   an output terminal connected to an output side of the resistance and an output side of the diode.

4. The power supply control circuit according to claim 1, further comprising a dissipation unit provided to the output sides of the voltage control unit and the current control unit and configured to cancel a difference between the control value of the voltage control unit and the control value of the current control unit.

5. The power supply control circuit according to claim 2, further comprising a dissipation unit provided to the output sides of the voltage control unit and the current control unit and configured to cancel a difference between the control value of the voltage control unit and the control value of the current control unit.

6. The power supply control circuit according to claim 3, further comprising a dissipation unit provided to the output sides of the voltage control unit and the current control unit and configured to cancel a difference between the control value of the voltage control unit and the control value of the current control unit.

7. A power supply control method of controlling the power supply control circuit according to claim 1, comprising:
   a first step of starting an output of a current command value;
   a second step of starting an output of a voltage command value;
   a third step of starting an output of an OFF limit value;
   a fourth step of stopping the output of the voltage command value;
   a fifth step of stopping the output of the current command value; and
   a sixth step of stopping the output of the OFF limit value.

* * * * *